United States Patent [19]
Bystron

[11] 3,858,473
[45] Jan. 7, 1975

[54] FABRIC CONTROL MECHANISM FOR TEXTILE CUTTING DEVICE

[75] Inventor: Bruno Bystron, Ingolstadt, Germany

[73] Assignee: Schubert & Salzer Maschinenfabrik Aktiengesellschaft, Ingolstadt, Germany

[22] Filed: July 16, 1973

[21] Appl. No.: 379,479

[30] Foreign Application Priority Data
July 20, 1972   Germany............................ 2235556

[52] U.S. Cl. ............... 83/401, 83/155, 89/925 CC, 198/193, 198/203
[51] Int. Cl............................................ D06h 7/24
[58] Field of Search ............... 83/155, 925 CC, 401; 198/193, 203

[56] References Cited
UNITED STATES PATENTS

| | | | |
|---|---|---|---|
| 1,843,208 | 2/1932 | Cutler............................ | 198/203 X |
| 2,639,025 | 5/1953 | Schmitt.......................... | 198/203 X |
| 3,304,820 | 2/1967 | Muller et al.................... | 83/925 CC |
| 3,347,121 | 10/1967 | Wiatt............................. | 83/925 CC |
| 3,497,056 | 2/1970 | Clark............................. | 198/203 |
| 3,642,120 | 2/1972 | Dunhan......................... | 198/203 |
| 3,666,085 | 5/1972 | Folkes........................... | 198/193 |

*Primary Examiner*—J. M. Meister
*Attorney, Agent, or Firm*—Robert W. Beach; Ms. R. M. Van Winkle

[57] ABSTRACT

The fabric web to be cut by a textile cutting device is transported by an endless belt carrier relative to a cutting tool. Sockets in the belt margin are engaged by teeth on one side of a short coupling belt underlying the carrier margin in the cutting region for positively supporting and driving the carrier. Teeth on the coupling element side opposite the carrier engage a toothed drive roller and toothed guide wheels. Pressure rollers cooperate with the guide wheels to press the carrier and coupling element into intimate engagement. The lower carrier belt portion is supported so that its stretches between supports are slack. A roller beneath the cutting tool backs the carrier to fix the carrier height at the cutting location. The coupling element may be an endless chain having carrier socket-engaging teeth projecting therefrom.

5 Claims, 7 Drawing Figures

Patented Jan. 7, 1975 3,858,473

FABRIC CONTROL MECHANISM FOR TEXTILE CUTTING DEVICE

The present invention relates to mechanism for controlling a reversing fabric carrier adjacent to a cutting tool.

The use of endless transport belts for carrying textile fabric webs to be cut is conventional, as is belt drive mechanism utilizing one of the turning rollers to drive the belt for movement back and forth relative to the cutting tool. A principal disadvantage of these arrangements is that reversing of belt direction causes the fabric movement to be retarded and accelerated uncontrollably as a result of the elasticity of the transport belt and the inertia of the entire mechanism and the fabric carried by it.

As disclosed in U.S. Pat. No. 3,304,820, a fabric web transport belt may be strengthened by slats and driven by drums having slat-receiving grooves. If an arcuate drum is used to support the belt and fabric beneath the cutting tool, the fabric web is subjected to localized variation in support and restraint resulting in shifting or displacement of the web and, consequently, in imprecise cutting.

It is the principal object of the present invention to avoid these disadvantages of known devices and to provide an endless belt fabric web carrier with a drive which facilitates precise cutting of the fabric web. It is an important object to provide such a drive which is simple and economical in construction.

These objects are accomplished in accordance with the present invention by supporting the fabric carrier to form a level surface in the area of the cutting tool and by providing a coupling element to drive the carrier positively through a stretch surrounding the cutting tool. The coupling element includes teeth positively engageable in sockets in the fabric carrier and members positively engageable with a toothed roller drive. To assure continuous contact between the coupling element and the fabric carrier, toothed guide and support rollers are provided. Pressure rollers hold the fabric carrier firmly against the support rollers to prevent any slip between the coupling teeth and carrier sockets.

It is preferred that the carrier belt have sockets in its opposite margins to receive the coupling teeth and that the side of such notches in the direction of carrier travel be strengthened, such as by metal clamps. Such strengthening will deter deterioration of the sockets and carrier margins resulting from variable-force engagement by the teeth of the coupling element. Preferably, the coupling element is a belt underlying the carrier having teeth on its opposite sides.

To reduce the inertial mass at the instant of reversal of the fabric-carrier direction, the stretch of the carrier belt which is out of fabric-bearing position is loosely supported to form sagging or slack stretches. A backing element extending transversely of the carrier across its breadth and beneath its fabric-bearing stretch supports the carrier directly below the cutting tool to fix the height of the carrier in the cutting region.

The invention is described in further detail below in conjunction with the schematic representation shown in the drawings.

Figure 1:
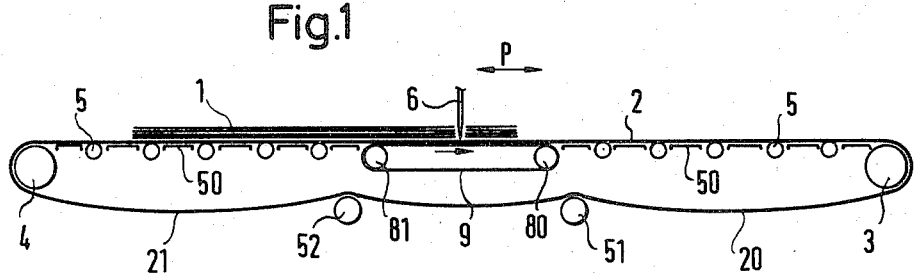
FIG. 1 is a schematic side elevation of the fabric web carrier having a coupling element according to the present invention.

Fabric webs 1 are held, such as by suction, on a carrier in the form of an endless conveyor belt 2 shown in FIG. 1. Conveyor belt 2 is guided by loop end rollers 3 and 4, and the upper stretch of the belt on which the fabric is carried is further guided by support rollers 5. Supporting plates 50 between guide rollers 5 prevent sagging of the upper belt stretch. Pieces are cut from a fabric by reciprocation of cutting tool 6 describing one geometric component of the cutting line and by reciprocation of the carrier and fabric webs thereon to describe the other, perpendicular, component of the cutting line. Since the carrier must be quickly reversed for guiding the fabric relative to a cutting tool 6, it is important to minimize the inertial mass subject to an instantaneous change in direction. Consequently, the lower carrier belt portion is of a length greater than the distance between the axes of idler rollers 3 and 4, and such portion is supported by spaced rollers 51 and 52 so that the relatively long unsupported portion 20 between rollers 3 and 51 and portion 21 between rollers 52 and 4 can sag slackly. Consequently, upon change of direction of the upper belt stretch, only the mass of the taut upper belt portion between rollers 3 and 4 and the fabric carried thereon creates the inertial force which must be instantaneously overcome when the belt direction is reversed.

Figure 2:
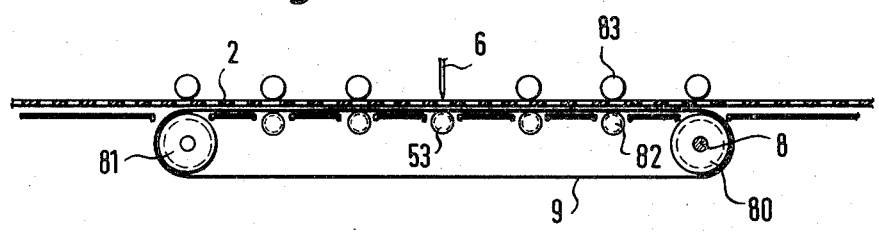
FIG. 2 is an enlarged section through the carrier belt schematically showing the belt drive in side elevation.
Figure 3:
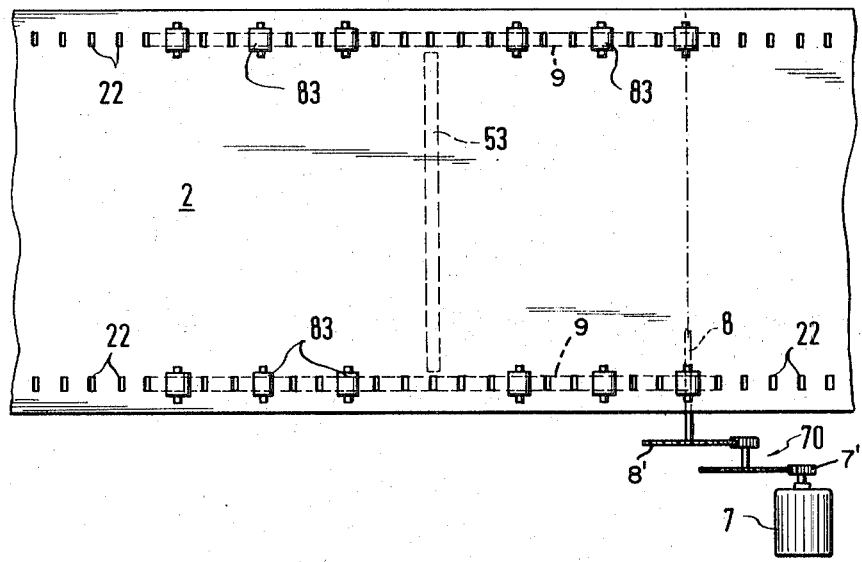
FIG. 3 is an enlarged schematic top plan of the carrier shown in FIG. 1 with parts broken away.

As shown in FIGS. 2 and 3, a carrier-backing device shown as a roller 53 extends transversely of belt 2 substantially across the breadth of the belt directly beneath the cutting tool 6. Such supporting member could alternatively be in the form of a T-bar, I-bar or box, for example. The supporting member 53 is vertically adjustable and permits precise setting and maintenance of the height of belt 2 and the fabric webs carried thereon relative to cutting tool 6.

In order to impart reciprocable motion to conveyor belt 2 in the direction of the double-headed arrow P in FIG. 1, the belt is driven by a reversible motor 7 shown in FIG. 3. The power from the shaft of motor 7 is transmitted through a gear train shown schematically as including a gear wheel 7' on the motor shaft, a stepped gear 70 and a gear wheel 8' on axle 8 carrying a pair of drive rollers 80. The driving connection between rollers 80 and belt 2 is effected by a coupling element shown in FIGS. 1 through 4 as a pair of parallel, spaced endless belts 9. As shown in FIG. 3, belts 9 are quite narrow relative to the width of belt 2 and are spaced to underlie the edge margins of belt 2. Also, shown in that figure, the ends of height-adjusting roller 53 are spaced inward from the edges of belt 2 to provide clearance for coupling belts 9 while such roller spans substantially the entire distance between the parallel marginal coupling belts. The margins of belt 2 overlying coupling belts 9 are located beyond the transverse path of cutting tool 6.

Figure 4:
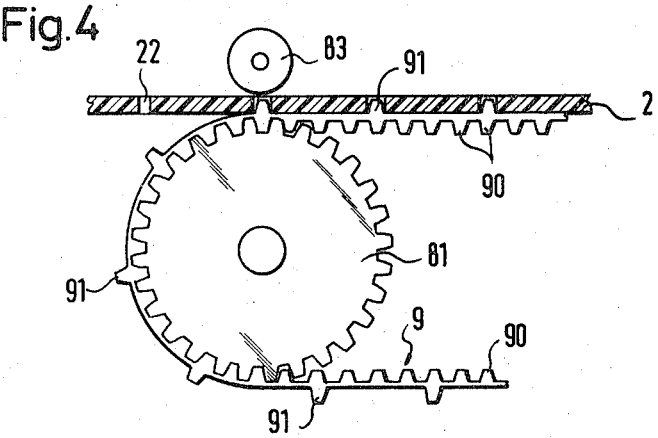
FIG. 4 is an enlarged schematic view of the carrier and coupling element, parts in section, parts in side elevation and parts being broken away.

As shown in FIG. 4, belt 9 has teeth 90 for positive engagement with a toothed drive wheel 80 at one end of the belt loop (FIGS. 1 and 2) and a toothed guide wheel 81 at the opposite loop end. On the outer side of belt 9, opposite teeth 90, is a set of spaced projections or teeth 91 engageable with correspondingly spaced slots or sockets 22 in the margin of carrier belt 2. Sockets 22 can be easily formed by punching the belt margin at predetermined locations along the length of the belt. Belts 9, through their opposing sets of teeth, constitute coupling elements for coupling the drive motor 7 and the carrier belt 2 for reciprocable drive of the carrier belt.

The upper stretches of belts 9 are supported by a plurality of toothed wheels 82 shown in FIG. 2. In order to assure positive, intimate engagement between and prevent relative slippage of coupling belts 9 and carrier belt 2 along the lengths of the upper stretches of belts 9, pressure rollers 82 engage the margins of belt 2 on the opposite side of and directly above rollers 82 to effect deep penetration of teeth 91 into sockets 22. Such positive control of belts 2 and 9 along such the upper stretches of belts 9 assure that carrier belt 2 is positively controlled in the cutting region and for a substantial distance fore and aft of the cutting tool 6. Consequently, variations in speed, sagging and stretching of carrier belt 2 and the fabric webs carried thereon are reduced to a minimum. Furthermore, relative movement between belt 2 and fabric 1 is virtually eliminated so that cutting accuracy is materially and substantially improved over that obtainable by use of conventional fabric carrier mechanism.

Figure 5:
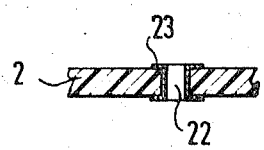
FIG. 5 is a longitudinal fragmentary section through the notched carrier margin.
Figure 6:
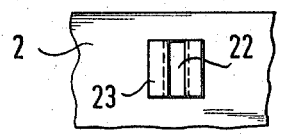
FIG. 6 is a fragmentary top plan of the carrier portion shown in FIG. 5.

It is desirable to strengthen the fore and aft sides of sockets 22 to withstand alternating impact by teeth 91 as belts 9 are reversed and to strengthen and stiffen belt 2, otherwise weakened by the socket perforations. A simple construction for strengthening sockets 22 is shown in FIGS. 5 and 6, in which channel shaped metal clamps 23 are inserted through the sockets and pinched to embrace the fore and aft socket sides, respectively.

Figure 7:
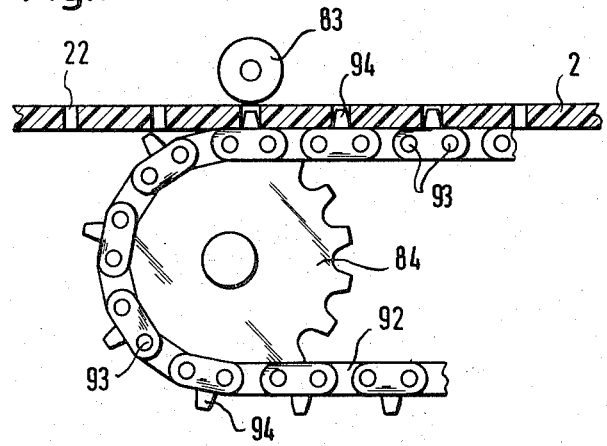
FIG. 7 is a schematic view similar to FIG. 4 showing a modified coupling element.

The coupling element could take other forms than the specific belt construction shown in FIGS. 1 through 4. For example, an endless chain 92 may replace belt 9, as shown in FIG. 7. In this instance the sprocket guide wheel 84 at one end of the chain loop and sprocket guide wheel (not shown) at the opposite loop end are provided with suitable teeth engageable between pins or rollers 93 connecting opposite sides of the chain, which rollers constitute the sprocket-engaging teeth. Chains 92 carry spaced projections or teeth 94 on their sides opposite sprocket 84 for engagement in sockets 22 in the margin of carrier belt 2. As previously described, it is prefered that pressure rollers 83 be provided on the upper side of the carrier belt margin to assure deep penetration of chain teeth 94 into sockets 22. A plurality of supporting rollers for the chain upper stretch and a plurality cooperating pressure rollers should be provided corresponding to the rollers 82 and 83 described in connection with FIG. 2.

A single coupling element 9 or 92 could be provided along one margin of belt 2; or parallel coupling elements may be provided to engage opposite margins of carrier belt, as shown and described in the preferred construction shown in FIG. 3. While the coupling element must engage the carrier belt at least in the region adjacent to cutting tool 6, such coupling element could be increased in length to extend along a greater portion of the upper stretch of conveyor belt 2 carrying the fabric webs 1 to be cut.

I claim:

1. Fabric carrier mechanism for a textile cutting machine having a cutting tool comprising a reciprocable fabric carrier having a flat area adjacent to the cutting tool, drive means, coupling means for coupling said fabric carrier and said drive means for reciprocably driving said fabric carrier and including first teeth means engageable with said drive means and second teeth means engageable with a portion of said fabric carrier adjacent to said flat area, the drive means including a toothed wheel complementally engageable with the first teeth means, and a plurality of spaced toothed guide rollers engageable with the first teeth means.

2. The fabric carrier mechanism defined in claim 4, and a plurality of pressure rollers cooperating with the guide rollers, portions of the coupling means and the fabric carrier means disposed between the guide rollers and said pressure rollers, said portions of the coupling means and the fabric carrier means being pressed into intimate engagement by the cooperating guide rollers and pressure rollers.

3. The fabric carrier mechanism defined in claim 1, in which the fabric carrier is an endless loop having a first taut stretch engageable with the coupling means and a second slack stretch.

4. The fabric carrier mechanism defined in claim 1, in which the cutting means is reciprocable transversely of the direction of fabric carrier reciprocation, and fabric carrier backing means engageable with the side of the fabric carrier flat area opposite the cutting means and coextensive with the path of cutting means reciprocation.

5. The fabric carrier mechanism defined in claim 1, the cutting means being reciprocable transversely of the direction of fabric carrier reciprocation, the improvement comprising a coupling means disposed near each margin of the fabric carrier outside the path of the cutting means, and fabric carrier backing means engageable with the side of the fabric carrier flat area opposite the cutting means between the coupling means and coextensive with the path of cutting means reciprocation.

* * * * *

PO-1050
(5/69)

UNITED STATES PATENT OFFICE
CERTIFICATE OF CORRECTION

Patent No. 3,858,473          Dated   January 7, 1975

Inventor(s)   Bruno Bystron

It is certified that error appears in the above-identified patent and that said Letters Patent are hereby corrected as shown below:

Title page, Section 56, change "Muller et al." to --Müller et al.--; same section, change "Dunhan" to --Duhan--.

Column 4, line 26, cancel "4" and insert --1--;

Signed and sealed this 29th day of April 1975.

(SEAL)
Attest:

RUTH C. MASON
Attesting Officer

C. MARSHALL DANN
Commissioner of Patents
and Trademarks